Figure 1:
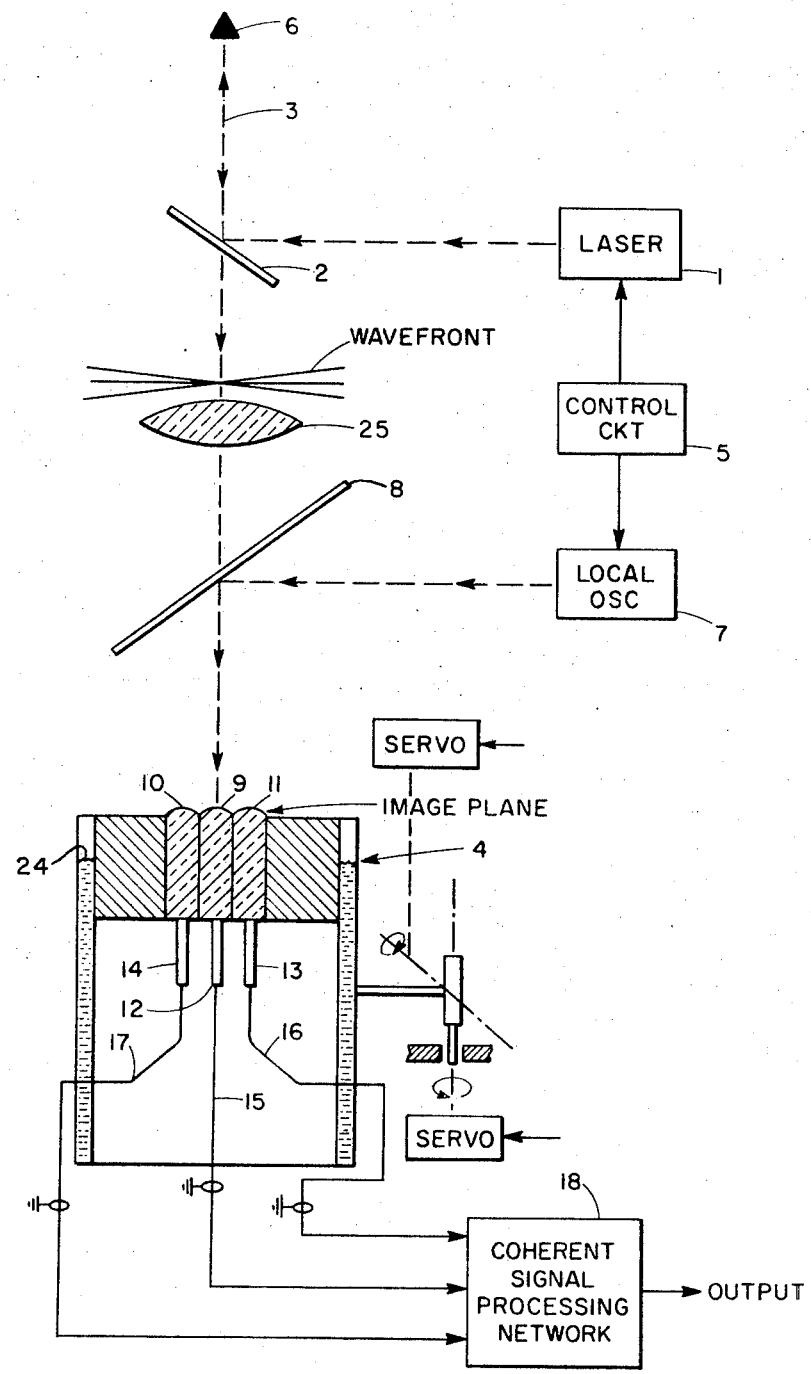

United States Patent [19]
Pace et al.

[11] 3,746,454
[45] July 17, 1973

[54] INFRARED RECEIVER FOR OPTICAL RADAR

[75] Inventors: Frank P. Pace, Dixhills; Ronald A. Lange, Huntington; Frank R. Arams, Lake Success, all of N.Y.

[73] Assignee: The United States of America as represented by the Sectetary of the Navy, Washington, D.C.

[22] Filed: Mar. 3, 1971

[21] Appl. No.: 120,564

[52] U.S. Cl......... 356/152, 250/220 M, 250/83.3 H
[51] Int. Cl. ........................................ G01b 11/26
[58] Field of Search................ 350/167; 250/83.3 H, 250/220 M, 204; 62/DIG. 9; 356/152, 4, 5, 141

[56] References Cited
UNITED STATES PATENTS 3,482,103  12/1969  Martinsen ......................... 250/204
3,397,314  8/1968  Weiner ......................... 250/83.3 H
2,909,668  10/1959  Thurlby et al................. 250/220 M

*Primary Examiner*—Benjamin A. Borchelt
*Assistant Examiner*—S. C. Buczinski
*Attorney*—R. S. Sciascia and L. I. Shrago

[57] ABSTRACT

There is disclosed a receiver for an optical radar utilizing a two-dimensional array of microlens image dissectors which completely fills an area of an image plane. Each microlens is directly coupled to a mixer-detector element. The array is adapted to be illuminated with returned focus radiation from a remote reflecting target and with a planar wave of optical energy from a local oscillator. The output signals of the mixer-detectors are analyzed and utilized to orientate the array such that the maximum amplitude output signal corresponds to the central microlens of the array.

6 Claims, 4 Drawing Figures

Frank P. Pace
Ronald A. Lange
Frank R. Arams
INVENTORS

Frank P. Pace
Ronald A. Lange
Frank R. Arams
INVENTORS

INFRARED RECEIVER FOR OPTICAL RADAR

The invention described herein may be manufactured and used by or for the Government of the United States of America for governmental purposes without the payment of any royalties thereon or therefor.

This invention relates to optical radars and, more particularly, to an infrared receiver for use with such an optical radar which is capable of distinguishing a multiplicity of targets at substantial ranges with an expanded instantaneous field of view without loss of resolution.

Present optical radar systems cannot instantaneously resolve a multiplicity of targets due to the lack of techniques for constructing large spatially coherent two-dimensional arrays of detectors with nine elements (3 × 3) or larger. This invention describes a technique for the construction of large spatially coherent two-dimensional arrays with the additional benefit that no IR energy is lost between elements in the array.

The subject invention is an infrared receiver comprising the combination of a coherent array of mixer elements and an array of microlens image dissectors matched to the mixing elements. The microlenses are illuminated not only with the return focused radiation from a target but also with a plane wave local oscillator which is heterodyned with the returned signal. These combined waves are channeled to different mixing elements where an IF signal is produced corresponding in amplitude and in phase with the incoming signal. The mixing elements are encased in a support member which also serves to hold a microstrip substrate. This microstrip serves as a transmission line between the mixer elements and a special coaxial connector since the output of the mixers is a wideband IF signal extending to microwave frequencies.

The array of microlenses consists of an arrangement of small, thick rectangular lenses that fill the image plane and dissect it into subdivisions that are reduced in area by the lens, to match the capture area of each mixer element of the receiving array.

In this way each element covers an equal solid angle of the sky and the cross-over points between mixer elements can be controlled by varying the focused spot size of the receiving optics. The property of having each position in the image plane correspond to a different skewing angle in the object space follows from the property of any input optical aperture which, by virtue of its forming an image, performs a Fourier transformation of object space into image space such that each skewing angle in object space corresponds one-to-one with a transverse position in image space within the limits of validity of optical Fourier theory.

Thus, targets transversing the field of view of the microlens array will reflect energy in varying amounts to each of the lenses as the target transverses the effective field of view of the microlens array. This movement or angular position of the target is reflected in the amplitude of the outputs of the mixer elements. Phase coherent signal processing networks are provided to extract such data as pointing errors for tracking a target or for discriminating between several targets. A servo loop for pointing the transmitter and receiver may also be included.

The array is conductively cooled for example to 4.2°K which is the operating temperature of Ge:Cu detector, to 20°K for Ge:Hg, or higher temperatures for other materials. The combined microlens, mixer, microstrip configuration results in a receiver with substantially increased sensitivity and therefore provides the laser radar with a substantial increase in radar range for a given transmitter power. The entire heterodyne reception permitting described hereinafter, in combination with the above apparatus, preserves the frequency and phase of the target return signal, thereby ermitting the extraction of doppler range rate and target scintillation signatures and also permits the coherent processing of multiple signals at a convenient intermediate frequency. This property can be one of the many phenomena in discriminating against false or decoy targets.

As mentioned before, this system has excellent background discrimination and is not affected by normal background levels, including direct sunshine. This is due to the extremely narrow predetection bandwidth relative to non-heterodyne detectors of the receiver and the low spectral density of thermal sources. It should be pointed out that this array guarantees good spatial discrimination in that the heterodyned receiver element does not respond to stray signals that are not critically aligned with the plane wave local oscillator signal. Such phenomena such as scattering side lobes induced by dust or imperfections in the system optics do not affect the spatial discrimination of this heterodyned receiver as readily as that of an envelope detector.

As a result of the coherent heterodyned detection technique, the subject array results in an expanded instantaneous field of view without loss of spatial resolution. The subject system has an ability to resolve multiple targets within this expanded field of view; and, because of the coherent summing of the individual mixer outputs, a monopulse capability, i.e., the ability to obtain directional pointing information on the basis of a single observation, similar to that obtained with a four-element microwave receiving antenna may be obtained. This monopulse capability with the phase coherent processing of the signals in each channel is not achieved in the case of a mosaic of envelope detectors.

A primary object of the present invention is to provide a receiver for an optical radar system wherein the heterodyne signal is introduced into the system as a planar wave in the signal return path of the laser beam.

Another object of the present invention is to provide an infrared receiver in which the incoming signal energy is focused on an image dissector made up of an array of microlenses which is also illuminated by a locally generated heterodyning signal.

Another object of the present invention is to provide an optical detector in which an array of microlenses in the image plane of the optical system is coupled to an array of mixer-detector elements that feed a plurality of microstrip transmission lines where 1. A technique for constructing two-dimensional arrays of microlenses and mixer elements that is expandable from a 2 × 2 (4 element) array to a 10 × 10 (100 element) array or larger.
2. This array gives an expanded instantaneous field of view without loss of spatial resolution.
3. The beam cross-over points between adjacent mixer elements can be controlled by a change in f/number of the receiving optics.
4. There are no gaps between the field of view of adjacent mixer elements and thus no blind spots in the field of view.

Figure 2:
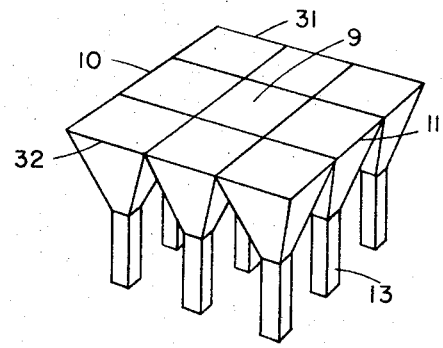
Figure 3:
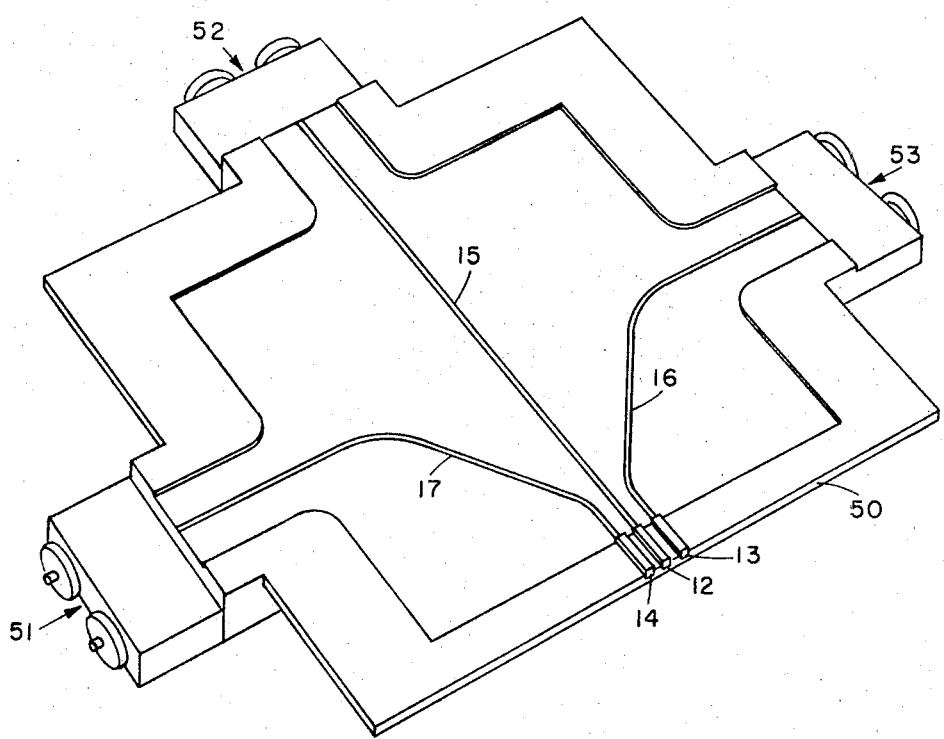
Figure 4:
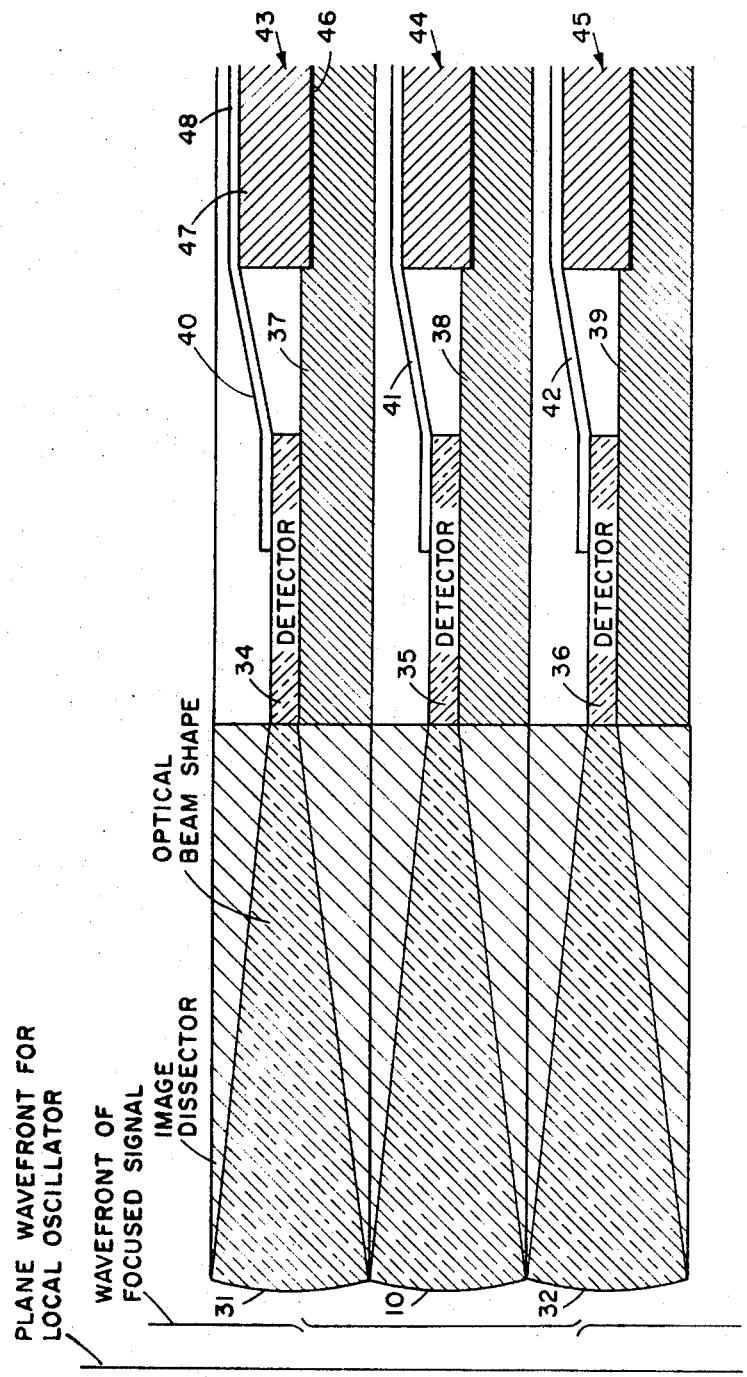

Other objects, advantages and novel features of the invention will become apparent from the following detailed description of the invention when considered in conjunction with the accompanying drawings wherein:

FIG. 1 is a schematic diagram of an object detecting system utilizing the receiver of the present invention;

FIG. 2 schematically illustrates an image dissector consisting of a 3 × 3 array of microlenses feeding a similar array of detector-mixer elements;

FIG. 3 shows the microstrip fanout arrangement employed with each row of mixer-detector elements; and FIG. 4 is a vertical cross-sectional diagram of a three-element column of microlenses together with associated mixer-detector elements and microstrip segments.

Referring now to FIG. 1, which is an optical radar system of the type which may utilize the receiver apparatus of the present invention, it will be seen that the system includes a laser transmitter 1 whose output is controlled by suitable optics, including mirror 2, to form an emerging beam that is directed along the boresight 3 of an infrared detector as it proceeds through the atmosphere so that it illuminates a remote target area substantially greater than the field of view of the infrared detector.

In the particular case shown, the laser beam is reflected by remote target 6 back to the infrared detector array 4 along a return path which corresponds to boresight 3. In a suitable area in front of the image plane of the optical system, the returned radiation combines with the local oscillator that is in the form of a plane wave of optical radiation from the transmitter. This locally generated signal energy is derived from oscillator 7 which may be synchronized or otherwise regulated so as to introduce its signal into the system at the appropriate time in the receiving cycle. As, for example, in the arrangement shown, the local oscillator is directed by a half silver mirror 8 into the path of the returning laser signal. It will be mentioned that appropriate complementary optical elements, 25, are utilized to choose the optical cross-over points between elements. In the special case shown, where the target 6 lies along the boresight of the detector assembly, as determined by the longitudinal axis of symmetry of the central microlens 9 of the microlens array, a maximum amount of mixed radiation irradiates this lens. Of course, some target energy will reach adjacent microlenses, as determined by the optical cross-over points and the optical side lobes or diffraction rings of the focused target energy.

Each of the microlenses has a detector-mixer element positioned adjacent to its output side. Thus, the signal energy illuminating lens 9 is concentrated at mixer-detector 12 and that of adjacent lenses 10 and 11 concentrated at detectors 14 and 13. Each of the detector-mixer elements of a particular row of the array feeds a microstrip arrangement consisting of transmission line sections, such as 15, 16 and 17, perhaps better shown in FIG. 3. Thereafter, the signals present in the system are sent through coaxial lines to a coherent signal processing network 18. It will be appreciated that, only by coherently examining the amplitude of the signals appearing in the outputs of the various detectors and determining which of these signals has the greatest amplitude, one can identify which particular microlens of the array is aligned with the illuminated target.

The complete detector assembly, including the microlens elements, the detectors and the microstrip lines, are all conductively cooled to a cryogenic temperature suitable for the mixer elements used, diagrammatically represented at 24 in FIG. 1, to minimize thermionic noise and other forms of random interference.

In the arrangement shown in FIG. 1, only three microlens elements forming one row of the array are shown. In actual practice, any preselected number of rows and elements may be utilized, and FIG. 2 schematically depicts how a 3 × 3 array would feed a corresponding number of mixer-detector elements. As will be seen from a study of this showing, the microlenses are of generally rectangular shape with their flat end abutting mixer-detector elements. Each mixer-detector has a length about 15 times its width in order to achieve the necessary quantum efficiency for signal detection purposes.

FIG. 4, which is a sectional view taken through a vertical column of the microlens array, shows the rectangular microlenses, such as 31, 10 and 32. Abutting the flat end of each microlens is a mixer-detector element, such as 34, 35, 36, which rest on conducting plates 37, 38, 39, respectively. The output from each detector is coupled through a connecting wire 40, 41, 42 to one of a microstrip transmission line 43, 44, 45. Each microstrip transmission line includes a ground plane conducting strip 46, a thickness of alumina 47 in contact therewith and a deposited strip of conducting material 48 on the other surface of the alumina substrate. As perhaps best shown in FIG. 3, the microstrip arrangement cooperating with each row of mixer-detectors, such as 12, 13 and 14, fans out so as to minimize those portions of the lines which are parallel to each other. This configuration, as is well known, minimizes crosstalk between these circuits.

FIG. 3 also illustrates how each row of mixer-detector elements is positioned in channels cut in the rim portion of a frame 50. Each of the other sides of this frame are provided with suitable coaxial terminals, such as 51, 52 and 53, where the transmission lines end and join the external coaxial lines which feed the various IF amplifiers.

When the infrared detector assembly 4 is used with a $CO_2$ laser operating in the 10.6 micron region of the spectrum, the various microlenses of the array are made of germanium. The various detector-mixer elements are made of Ge:Cu for maximum frequency response. For lower frequency responses, other material such as doped silicon or a mixed crystal such as HgCdTe may be used. The biasing voltage for the detectors, as is well known, may be applied to the conducting wires 40, 41, 42, which wires, it will be recalled, also serve as the IF signal extracting means.

The microlenses are antireflection coated at 10.6 um to minimize reflections at each interface. Crosstalk is prevented by careful optical alignment and physical separation of the beams focused by each microlens.

In addition to the copper-doped germanium noted above, mercury-doped germanium, aluminum-doped silicon and mercury-cadmium telluride may be used as the detector materials. Thus, other transparent infrared materials may be used for the lenses with appropriate alterations due to the indices of refraction of these materials.

It will be appreciated that the arrangement shown in FIG. 4 permits any heat generated in the detector-mixer array to be quickly transmitted to the various copper plates 37, 38, and 39 on which these detectors rest, thus assuring that the heat due to the local oscillator power and D.C. bias power can be extracted with a minimum rise in the operating temperaof the mixer elements.

What is claimed is:

1. Apparatus for use in an optical radar system of the type employing a pulsed laser as the transmitting means, the combination of
    a multiplicity of microlenses arranged in a two-dimensional array such that the front radiant energy receiving surfaces of said microlenses completely fill an area of an image plane;
    a mixer-detector element contacting the back surface of each microlens;
    means for illuminating the front surfaces of said array of microlenses with a planar wave of optical radiation whose frequency differs from that of said pulsed laser, said planar wave of optical radiation acting within said mixer-detectors as a heterodyning signal with any laser radiation returned from any remote reflecting target within the field of view of said array and focused thereon; and
    means responsive to the amplitude of the signals appearing in the outputs of said mixer-detector elements for positioning said array of microlenses such that the longitudinal axis of symmetry of a central microlens of said array is spatially aligned with said remote reflecting target.

2. In an arrangement as defined in claim 1 wherein the contacting area of each mixer-detector element is of the same size as the back surface of each microlens.

3. In an arrangement as defined in claim 1 wherein said microlenses are made of germanium and said detector-mixer elements are made of a germanium-copper mixture whenever the pulsed laser is operating in the 10.6 micron region of the spectrum.

4. In an arrangement as defined in claim 1 wherein the back surface of each microlens is planar and each mixer-detector element is of generally rectangular shape with its length considerably greater than its width.

5. In an arrangement as defined in claim 1 wherein said multiplicity of microlenses are arranged in horizontal rows and vertical columns and wherein a microstrip transmission line is connected to the output of each mixer-detector element,
    the microstrip transmission lines connected to those mixer-detector elements which contact a particular row of microlenses having a fanout pattern so as to minimize those portions of these microstrip transmission lines which are parallel to each other.

6. In an arrangement as defined in claim 5 wherein the microlenses, the mixer-detector elements and the microstrip transmission lines are conductibly cooled to a cryogenic temperature for minimizing thermionic noise and random interference.

* * * * *